United States Patent [19]

Damon

[11] Patent Number: 5,751,470

[45] Date of Patent: May 12, 1998

[54] METHOD FOR ENHANCED PRINT QUALITY ON PRINT ENGINES WITH AT LEAST ONE HIGH RESOLUTION DIMENSION

[75] Inventor: Brian Wesley Damon, Lexington, Ky.

[73] Assignee: Lexmark International, Inc., Lexington, Ky.

[21] Appl. No.: 614,086

[22] Filed: Mar. 12, 1996

[51] Int. Cl.$^6$ ............... H04N 1/40; G06F 15/00; G01D 9/42
[52] U.S. Cl. ............... 358/298; 358/447; 358/455; 358/457; 395/107; 395/108; 347/252
[58] Field of Search ............... 358/296,298, 300, 358/443, 447, 448, 455–466, 530, 534–536; 395/101, 107–109, 112, 128; 347/129, 131, 224, 225, 247, 251, 252, 254, 900

[56] References Cited

U.S. PATENT DOCUMENTS

| | | | |
|---|---|---|---|
| 4,816,863 | 3/1989 | Lee | 355/14 E |
| 4,868,587 | 9/1989 | Loce | 346/157 |
| 4,924,301 | 5/1990 | Surbrook | 358/75 |
| 5,109,283 | 4/1992 | Carley | 358/298 |
| 5,134,495 | 7/1992 | Frazier | 358/298 |
| 5,170,261 | 12/1992 | Cargill et al. | 358/298 |
| 5,185,852 | 2/1993 | Mayer | 395/109 |
| 5,245,355 | 9/1993 | Morton | 346/1.1 |
| 5,359,423 | 10/1994 | Loce | 358/296 |
| 5,387,985 | 2/1995 | Loce | 358/447 |
| 5,426,519 | 6/1995 | Banton et al. | 358/533 |
| 5,446,550 | 8/1995 | Maekawa | 358/298 |
| 5,455,681 | 10/1995 | Ng | 358/298 |
| 5,467,422 | 11/1995 | Itihara et al. | 358/298 |
| 5,479,263 | 12/1995 | Jacobs et al. | 358/298 |
| 5,528,384 | 6/1996 | Metcalfe et al. | 358/447 |
| 5,631,476 | 5/1997 | Overall | 358/448 |

FOREIGN PATENT DOCUMENTS

| | | | |
|---|---|---|---|
| 0 337 427 A2 | 10/1989 | European Pat. Off. | H04N 1/40 |
| 0670653A1 | 9/1995 | European Pat. Off. | H04N 1/40 |
| 0670654A1 | 9/1995 | European Pat. Off. | H04N 1/40 |
| 0 697 783 A1 | 2/1996 | European Pat. Off. | H04N 1/40 |
| 2 175 625 | 11/1986 | United Kingdom | B05C 3/18 |
| 2 295 258 | 5/1996 | United Kingdom | G06K 15/12 |

*Primary Examiner*—Eric Frahm
*Attorney, Agent, or Firm*—John A. Brady

[57] ABSTRACT

Information or data in the form of a mathematical representation of an area to be covered by a desired gray level, is sent, for example in floating point format, to a printer, e.g. a laser printer, for processing by the printer processor. The area to be covered is converted to a representation of pixels with the gray level converted to a digital value such as an eight bit value. Supercell representations with a gray level threshold matrix is provided, with each of the supercell array cells having threshold levels associated therewith whereby if the selected gray level is either above or below the threshold, one of print/no-print conditions are met for that pixel. Alternatively, if the level is the opposite and greater than a preselected range of values, the print/no-print condition will be opposite. If the gray level selected is in the direction of print, relative to the threshold level but is less than the full print level but within the range of values, then a look up table is entered corresponding to that threshold value and range and a length of time for laser turn on, corresponding to time slices, is selected dependent upon the difference between the gray level value and the threshold level. Pixel growth may proceed from either the left or right or some combination of both depending upon the coding. For example, the threshold level may include a range of value's in either direction causing growth to occur from either the left or the right edge of the cell.

1 Claim, 13 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 232 | 105 | 117 | 127 | 147 | 177 | 205 | 222 | 232 | 105 | 117 | 127 | 147 | 177 | 205 | 222 |
| 1 | 251 | 1 | 21 | 81 | 137 | 198 | 237 | 245 | 251 | 1 | 21 | 81 | 137 | 198 | 237 | 245 |
| 2 | 253 | 11 | 33 | 69 | 157 | 191 | 242 | 248 | 253 | 11 | 33 | 69 | 157 | 191 | 242 | 248 |
| 3 | 227 | 45 | 57 | 93 | 167 | 184 | 212 | 217 | 227 | 45 | 57 | 93 | 167 | 184 | 212 | 217 |
| 4 | 147 | 177 | 205 | 222 | 232 | 105 | 117 | 127 | 147 | 177 | 205 | 222 | 232 | 105 | 117 | 127 |
| 5 | 137 | 198 | 237 | 245 | 251 | 1 | 21 | 81 | 137 | 198 | 237 | 245 | 251 | 1 | 21 | 81 |
| 6 | 157 | 191 | 242 | 248 | 253 | 11 | 33 | 69 | 157 | 191 | 242 | 248 | 253 | 11 | 33 | 69 |
| 7 | 167 | 184 | 212 | 217 | 227 | 45 | 57 | 93 | 167 | 184 | 212 | 217 | 227 | 45 | 57 | 93 |
| 8 | 232 | 105 | 117 | 127 | 147 | 177 | 205 | 222 | 232 | 105 | 117 | 127 | 147 | 177 | 205 | 222 |
| 9 | 251 | 1 | 21 | 81 | 137 | 198 | 237 | 245 | 251 | 1 | 21 | 81 | 137 | 198 | 237 | 245 |
| 10 | 253 | 11 | 33 | 69 | 157 | 191 | 242 | 248 | 253 | 11 | 33 | 69 | 157 | 191 | 242 | 248 |
| 11 | 227 | 45 | 57 | 93 | 167 | 184 | 212 | 217 | 227 | 45 | 57 | 93 | 167 | 184 | 212 | 217 |
| 12 | 147 | 177 | 205 | 222 | 232 | 105 | 117 | 127 | 147 | 177 | 205 | 222 | 232 | 105 | 117 | 127 |
| 13 | 137 | 198 | 237 | 245 | 251 | 1 | 21 | 81 | 137 | 198 | 237 | 245 | 251 | 1 | 21 | 81 |
| 14 | 157 | 191 | 242 | 248 | 253 | 11 | 33 | 69 | 157 | 191 | 242 | 248 | 253 | 11 | 33 | 69 |
| 15 | 167 | 184 | 212 | 217 | 227 | 45 | 57 | 93 | 167 | 184 | 212 | 217 | 227 | 45 | 57 | 93 |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 3 | 26 | 15 | 15 | 15 | 7 | 7 | 3 | 3 | 26 | 15 | 15 | 15 | 7 | 7 | 3 |
| 1 | 0 | 15 | 26 | 26 | 15 | 7 | 3 | 3 | 0 | 15 | 26 | 26 | 15 | 7 | 3 | 3 |
| 2 | 0 | 15 | 26 | 26 | 15 | 7 | 3 | 3 | 0 | 15 | 26 | 26 | 15 | 7 | 3 | 3 |
| 3 | 3 | 26 | 26 | 26 | 15 | 7 | 3 | 3 | 3 | 26 | 26 | 26 | 15 | 7 | 3 | 3 |
| 4 | 15 | 7 | 7 | 3 | 3 | 26 | 15 | 15 | 15 | 7 | 7 | 3 | 3 | 26 | 15 | 15 |
| 5 | 15 | 7 | 3 | 3 | 0 | 15 | 26 | 26 | 15 | 7 | 3 | 3 | 0 | 15 | 26 | 26 |
| 6 | 15 | 7 | 3 | 3 | 0 | 15 | 26 | 26 | 15 | 7 | 3 | 3 | 0 | 15 | 26 | 26 |
| 7 | 15 | 7 | 3 | 3 | 3 | 26 | 26 | 26 | 15 | 7 | 3 | 3 | 3 | 26 | 26 | 26 |
| 8 | 3 | 26 | 15 | 15 | 15 | 7 | 7 | 3 | 3 | 26 | 15 | 15 | 15 | 7 | 7 | 3 |
| 9 | 0 | 15 | 26 | 26 | 15 | 7 | 3 | 3 | 0 | 15 | 26 | 26 | 15 | 7 | 3 | 3 |
| 10 | 0 | 15 | 26 | 26 | 15 | 7 | 3 | 3 | 0 | 15 | 26 | 26 | 15 | 7 | 3 | 3 |
| 11 | 3 | 26 | 26 | 26 | 15 | 7 | 3 | 3 | 3 | 26 | 26 | 26 | 15 | 7 | 3 | 3 |
| 12 | 15 | 7 | 7 | 3 | 3 | 26 | 15 | 15 | 15 | 7 | 7 | 3 | 3 | 26 | 15 | 15 |
| 13 | 15 | 7 | 3 | 3 | 0 | 15 | 26 | 26 | 15 | 7 | 3 | 3 | 0 | 15 | 26 | 26 |
| 14 | 15 | 7 | 3 | 3 | 0 | 15 | 26 | 26 | 15 | 7 | 3 | 3 | 0 | 15 | 26 | 26 |
| 15 | 15 | 7 | 3 | 3 | 3 | 26 | 26 | 26 | 15 | 7 | 3 | 3 | 3 | 26 | 26 | 26 |

----------Pointer -- (Gray level value - threshold value)----------

| Address #, bytes | Range, Time slices on | 0 | 1 | 2 | 3 | 4 | 5 | 6 | 7 | 8 | 9 | 10 | 11 |
|---|---|---|---|---|---|---|---|---|---|---|---|---|---|
| 0 | 2 | 3 | 5 | | | | | | | | | | |
| 3 | 3 | 2 | 4 | 6 | | | | | | | | | |
| 7 | 7 | 1 | 2 | 3 | 4 | 5 | 6 | 7 | | | | | |
| 15 | 10 | 1 | 2 | 2 | 3 | 4 | 5 | 5 | 6 | 7 | 7 | | |
| 26 | 12 | 1 | 1 | 2 | 2 | 3 | 4 | 4 | 5 | 5 | 6 | 7 | 7 |

FIG. 8

| | 0 | 1 | 2 | 3 | 4 | 5 | 6 | 7 | 8 | 9 | 10 | 11 | 12 | 13 | 14 | 15 | 0 | 1 | 2 | 3 |
|---|---|---|---|---|---|---|---|---|---|---|---|---|---|---|---|---|---|---|---|---|
| 0 | 183 | 183 | 183 | 183 | 183 | 183 | 183 | 183 | 183 | 183 | 183 | 183 | 183 | 183 | 183 | 183 | 183 | 183 | 183 | 183 |
| 1 | 183 | 183 | 183 | 183 | 183 | 183 | 183 | 183 | 183 | 183 | 183 | 183 | 183 | 183 | 183 | 183 | 183 | 183 | 183 | 183 |
| 2 | 171 | 171 | 171 | 171 | 171 | 171 | 171 | 171 | 171 | 171 | 171 | 171 | 171 | 171 | 171 | 171 | 171 | 171 | 171 | 171 |
| 3 | 171 | 171 | 171 | 171 | 171 | 171 | 171 | 171 | 171 | 171 | 171 | 171 | 171 | 171 | 171 | 171 | 171 | 171 | 171 | 171 |
| 4 | 159 | 159 | 159 | 159 | 159 | 159 | 159 | 159 | 159 | 159 | 159 | 159 | 159 | 159 | 159 | 159 | 159 | 159 | 159 | 159 |
| 5 | 159 | 159 | 159 | 159 | 159 | 159 | 159 | 159 | 159 | 159 | 159 | 159 | 159 | 159 | 159 | 159 | 159 | 159 | 159 | 159 |
| 6 | 147 | 147 | 147 | 147 | 147 | 147 | 147 | 147 | 147 | 147 | 147 | 147 | 147 | 147 | 147 | 147 | 147 | 147 | 147 | 147 |
| 7 | 147 | 147 | 147 | 147 | 147 | 147 | 147 | 147 | 147 | 147 | 147 | 147 | 147 | 147 | 147 | 147 | 147 | 147 | 147 | 147 |
| 8 | 135 | 135 | 135 | 135 | 135 | 135 | 135 | 135 | 135 | 135 | 135 | 135 | 135 | 135 | 135 | 135 | 135 | 135 | 135 | 135 |
| 9 | 135 | 135 | 135 | 135 | 135 | 135 | 135 | 135 | 135 | 135 | 135 | 135 | 135 | 135 | 135 | 135 | 135 | 135 | 135 | 135 |
| 10 | 123 | 123 | 123 | 123 | 123 | 123 | 123 | 123 | 123 | 123 | 123 | 123 | 123 | 123 | 123 | 123 | 123 | 123 | 123 | 123 |
| 11 | 123 | 123 | 123 | 123 | 123 | 123 | 123 | 123 | 123 | 123 | 123 | 123 | 123 | 123 | 123 | 123 | 123 | 123 | 123 | 123 |
| 12 | 111 | 111 | 111 | 111 | 111 | 111 | 111 | 111 | 111 | 111 | 111 | 111 | 111 | 111 | 111 | 111 | 111 | 111 | 111 | 111 |
| 13 | 111 | 111 | 111 | 111 | 111 | 111 | 111 | 111 | 111 | 111 | 111 | 111 | 111 | 111 | 111 | 111 | 111 | 111 | 111 | 111 |
| 14 | 99 | 99 | 99 | 99 | 99 | 99 | 99 | 99 | 99 | 99 | 99 | 99 | 99 | 99 | 99 | 99 | 99 | 99 | 99 | 99 |
| 15 | 99 | 99 | 99 | 99 | 99 | 99 | 99 | 99 | 99 | 99 | 99 | 99 | 99 | 99 | 99 | 99 | 99 | 99 | 99 | 99 |
| 0 | 87 | 87 | 87 | 87 | 87 | 87 | 87 | 87 | 87 | 87 | 87 | 87 | 87 | 87 | 87 | 87 | 87 | 87 | 87 | 87 |
| 1 | 87 | 87 | 87 | 87 | 87 | 87 | 87 | 87 | 87 | 87 | 87 | 87 | 87 | 87 | 87 | 87 | 87 | 87 | 87 | 87 |
| 2 | 75 | 75 | 75 | 75 | 75 | 75 | 75 | 75 | 75 | 75 | 75 | 75 | 75 | 75 | 75 | 75 | 75 | 75 | 75 | 75 |
| 3 | 75 | 75 | 75 | 75 | 75 | 75 | 75 | 75 | 75 | 75 | 75 | 75 | 75 | 75 | 75 | 75 | 75 | 75 | 75 | 75 |

METHOD FOR ENHANCED PRINT QUALITY ON PRINT ENGINES WITH AT LEAST ONE HIGH RESOLUTION DIMENSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to "dot" printers and more particularly relates to a method and technique for enhancing the print quality of images, line art and most text while maintaining the same logical resolution in both X and Y dimensions at the application level. (For purposes of this disclosure, the x dimension proceeds from the left edge of the print receiving media to the right edge and the y dimension proceeds from the top edge to the bottom edge of that media.) Current industry standard operating systems provide printing subsystems that present the user with a single resolution choice. Indeed, even though the internal interface to the driver provides a choice for x and y resolutions, almost no printer drivers have ever reported different resolutions for x and y. As a consequence almost no applications have seen or been tested with a non-square resolution. The resultant compatibility problems are not surprising.

2. Description of Related Art

A binary print engine typically represents an image as a collection of picture elements. The picture elements, otherwise referred to as pixels or pels, may be turned on or off individually to create the illusion of continuous gray levels through methods such as error diffusion, stochastic screening, or more classical halftone screening. This invention is based upon classical half toning but also may be applied to variations on stochastic screening or error diffusion. Print engines using classical halftone screening techniques must trade screen frequency (number of halftone cells or lines per inch (lpi)) for number of levels of gray (intensity). The gray levels may be effectively increased by using a larger number of pixels in a halftone supercell. These supercells utilize typically 1 to 4 dots per cell. A halftone cell comprised of multiple dots increases the number of gray levels that are "noise susceptible", i.e., sensitive to variations of process or raster uniformity. Moreover, this technique has drawbacks in that the dots within the supercell are not always the same size. If the basic halftone screen frequency is within the visible range (less than 200 lpi), these "anomalies" can be objectionable. By way of background, 53 lpi is visible, but of low quality, generally referred to as "newspaper quality". The start of high quality is 106 lpi, which presents normally good images, pleasing to the eye. However, even at this frequency, certain problems still exist, such as violin strings at an angle look beaded. Alternatively, 200 lpi presents very good images.

In classical literature on half toning, in some supercells of the prior art, pleasing gray tones are achieved by utilizing a non-Euclidian spot function and growing a black dot up to 50% coverage, then shrinking a white dot to 100% coverage. It is also well known that replication of the halftone cell should be performed along some angle other than 0 or 90 degrees. The human visual system is acutely sensitive to patterns that appear at 0 and 90 degrees. A standard practice in monochrome printers has been to replicate the halftone supercell at a 45 degree angle. Since 45 degree patterns do not coincide with the printing process, printer software developers simply describe a square area of dots that contain two "halftone cells". This square is easily replicated in the raster and process direction. A classical halftone screen example would be that used in OPTRA®[1] at 1200 dpi. This screen is a 106 lpi screen at 45 degrees. Two supercells are contained in a 16×16 pixel array. Each halftone cell contains a single "dot" so the 16×16 pixel array contains two dots such that the second is located 45 degrees from the first. The distance between the center of these two dots could be described as 8√2 pixels. The screen frequency would then be 1200 dpi/8√2 or 106 lpi. The screen angle would be 45 degrees.

[1] OPTRA is a trademark of Lexmark International Inc.

To achieve more pleasing results than can be achieved with the classical halftone, modern printers utilize techniques such as having multiple dots in the halftone supercell. Having more dots in the supercell allows smaller image features to be visible while maintaining the number of gray levels. Techniques such as PictureGrade™[2] grow 4 dots in the supercell (8 dots in the 16×16 pixel square area that contains two halftone supercells). At 600 dpi, the dots on the paper appear to be at a screen frequency of 106 lpi while the real supercell replication rate is 53 lpi. This technique has the advantage of providing a high screen frequency while having a large number of grays (128). It has the disadvantage in that dots in the supercell are not all the same intensity for selected gray levels. For example, some intensity levels have distinct 53 lpi patterns. For most images, the higher effective screen frequency with its inherent 'noise' is more pleasing than a true screen with fewer gray levels.

[2] PictureGrade is a trademark of Lexmark International Inc.

Print quality can be improved by increasing the "depth" of each pixel, i.e. increasing the number of intensity levels that can be represented by each pixel. For example, U.S. Pat. No. 4,868,587 issued on Sep. 19, 1989 to Loce et. al utilizes a "multilevel" laser to expose pixels at more than one level of exposure. However, certain printing processes such as laser and LED are unable to provide much more than on/off capability for a pixel at the currently popular resolutions. Both technologies, however, can have almost continuously variable pulse widths in one dimension with the upper frequency limited by the response of the laser diode and driver or the LED response. It is noted that both the laser and LED have their own response curves which present limitations, and the electronics that drive the same, regardless of the technology, are not necessarily adjacent the print head, and therefore the Electromagnetic (EM) radiation due to the distances necessary for signal travel and signal path orientation, presents a limitation (acts like an antenna). Moreover, the process response and "dot gain" will inhibit adjacent subpixel transitions. Additionally, the print mechanism of the laser is not quite as precise as desired; i.e. there is an energy spread to the lines above and below. Energy scatter can cause a blurring because of toner adhesion and development. This gives a "dot gain". Indeed, single pixels of white on black or black on white are often not possible.

This blurring or "stickiness" of toner is utilized in U.S. Pat. No. 5,134,495, issued on Jul. 28, 1992 to DP TEK. In Col. 7, lines 35–41 it is stated:

". . . the toner density response to optical exposure is a highly bi-state system. In FIG. 5 optical exposure time is the percentage of time that a moving laser beam is turned on as it sweeps over a given pixel, or picture element."

And in Col. 8, line 31–33,

". . . Hewlett-Packard Laser Jet Printer, the laser beam traverses a normal eight inch sweep in about 1.28 milliseconds . . ."

and at line 36 et seq.,

"When the laser is energized to provide 600 dots per inch resolution, each bit location may be energized for about 268 nanoseconds (nsec) or billionths of a second. The threshold level in the Hewlett-Packard Laser Jet is between 134 nsec and 201 nsec with energization for 134 nsec not producing a dot and energization for 201 or more nano seconds producing a dot."

The threshold value that is concerned with here is the threshold level of energy that is supplied by the laser for which toner will stick. The DP TEK process is such that at some portion of the time during each pass some of the toner will stick and other will not. In this process, during another pass of the laser, an overlap of additional energy will be supplied that will cause the toner to stick. In the system of the present invention, in the halftone supercell, the threshold level is binary, i.e. it is such that the dot will be turned on for printing or not turned on.

In the present invention, no reliance is placed on the application of additional energy to effect printing.

U.S. Pat. No. 5,378,985 issued on Feb. 7, 1995 to Loce et al. deals with bitmap image conversion utilizing statistically generated templates, implemented using LUT's to aid in conversion from one to another resolution for printing that is device dependent. The LUT's each represent a unique phase relationship between the first and second resolution bitmap, with each table entry representing the resulting output to be generated by the table in response to a specific pattern of input pixels within a pixel observation window. In the present invention, phase relationship is not relied upon for presentation of gray levels or for high resolution printing.

In U.S. Pat. No. 5,359,423, issued on Oct. 25, 1994 to Loce et. al a method for creating a template based filter for filtering an image bitmap is disclosed, wherein the filtering will result in an alteration of the bitmap resolution while preserving the density. The method is directed to the use of a representative set of page description language decomposed or scanned training documents, and statistical data derived from them in an automated process that generates one or more sets of template-pattern pairs that are employed as filters for resolution enhancement and/or conversion of bitmap images. With the present invention, template-pattern pairs are not employed along with training documents for generation of such template-pattern pairs.

In U.S. Pat. No. 5,109,283, issued on Apr. 28, 1992 to Carley, a raster driver is disclosed, which driver establishes a cell scan time period representing the horizontal length along a print line of an elemental cell print area. The driver generates, from the incoming data in the cell at least zero or two independently located drive signal transitions which cause the print engine to change state at selected points along the print lines to closely reproduce the image. This raster driver does not employ threshold comparison for print/no-print nor a range associated with selected thresholds for defining a timed laser "on" for time slices during a cell print.

In U.S. Pat. No. 5,245,355, issued on Sep. 14, 1993 to Morton, a method for gray level printing with amplitude and pulse width modulation is taught utilizing linear arrays of LED's. In the preferred embodiment, a circuit is provided that includes a look-up table that compares for each pixel to be printed a time-changing count from a threshold counter with a multibit signal representing a grey level table, a two bit signal is provided to the printhead and used to turn the LED on at an intensity level commensurate with the two bit signal. This process is repeated many times to determine the "on" time or pulse width of the LED for that pixel. Unlike the present invention, this patent teaches the use of intensity levels in LED's. Similar values mean that all are on or off or increase for all in a row. It does not employ a threshold map for determining on/off (binary) printing coupled with an arrangement that will allow for printing in a range of time slices/cell with relation to selected cells. Moreover, the look up tables for the present invention allow for local linearization (Gamma correction) for gray levels, which is not true in the Morton scheme.

In U.S. Pat. No. 4,816,863, issued on Mar. 28, 1989 to Lee, an exposure control system which permits accurate reproduction of optical density levels on an image is characterized by a dynamically corrected look-up table. The look-up table is used to calculate each desired exposure intensity level of each pixel of the image on the basis of data obtained during the exposure and development of an immediately preceding image. No such on the fly intensity level based upon exposure of the immediately preceding image is taught or otherwise dictated by the present invention.

U.S. Pat. No. 5,455,681, issued on Oct. 3, 1995 to Ng, discloses a method of transforming a high resolution binary data file to a lower resolution grey level file for printing by a lower resolution printer. This patent is of interest from a background viewpoint only to illustrate the state of the art.

In U.S. Pat. No. 5,185,852 issued on Feb. 9, 1993 to Mayer, antialiasing in the printing process of a computer system is implemented. The implementation makes use of current bitonal scan conversion routines to convert bitonal bitmaps to antialiased (gray scale) bitmaps with a reduced amount of computation. This is accomplished by the mapping member receiving the bitonal bitmap and for each pixel of the bitmap, assigning a predetermined gray scale value to a corresponding pixel in the gray scale bitmap. In the present invention, the gray scale threshold value (8 bit) is selected and provided to each cell of a fixed threshold map. Depending upon the threshold in the map and the 8-bit value provided, there is a print/no-print conclusion. Moreover, with respect to a threshold value of the next adjacent threshold, a range of time slices for laser on/off is selected, and the laser is allowed on for a selected period of time during printing of that cell or cells, as the case may be.

In U.S. Pat. No. 5,446,550 issued on Aug. 29, 1995 to Maekawa et al, is disclosed an image processor which generates a dot density pattern corresponding to input image data. The growth direction is proscribed but based upon a random signal. This allegedly results in a high quality image because of the lack of joinder between adjacent pixels. In the present invention, no random signals are utilized in the manner described to inhibit merging of the adjacent pixels.

In European Patent Application, publication number EP 0 670 653 A1 and 654 A2, published on Sep. 6, 1995 and with a U.S. priority date of Mar. 2, 1994, a method of multiple tone image generation is disclosed. The method preferably generates an N-tone image in lieu of a halftone image. The level of each pixel in the N-tone image is determined based on the levels of its corresponding pixel in the gray scale image and based on one of an original dither matrix or an error diffusion technique. As understood, the method relies upon the formation of successive intermediate N-tone images and the storage of the same by a starting utilization of a gray scale image operable against a multi-level dither matrix. Essentially, what is taught in this publication is to take the gray image and change the levels based upon the high level dither matrix to be an N-tone image set of data and from that determine how the different subpixels and segments underneath it will be turned on. In the invention disclosed herein, no N-tone images are generated, and in fact the invention is much simpler than that disclosed in the EP publication.

SUMMARY OF THE INVENTION

In view of the above, it is a principal object of the present invention to enhance the print quality of binary laser printers which are capable of extended resolution in at least one of two orthogonal directions, e.g. X or Y.

Another principal object of the present invention, is to provide a method and apparatus for simplifying printing of images, textual material and the like while increasing the ability to print a great number of gray scale levels in a binary print system, with almost any page description language (PDL).

Another object of the present invention is the provision of a technique that improves text, image, and halftone quality while allowing the print application and driver to assume a "square" resolution, i.e. uniform X and Y resolutions.

The forgoing is accomplished by sending information or data in the form of a mathematical representation of an area to be covered by a desired gray level for example in floating point format, to a laser printer, for processing by the printer processor. The area to be covered is converted to a representation of pixels with the gray level or intensity converted to a common basis, for example, an eight bit value. Supercell representations with a gray level threshold matrix is provided, with each of the cells of the supercell array having threshold levels associated therewith whereby if the selected gray level is below the threshold value of a particular pixel's corresponding threshold cell, a no-print condition is met for that pixel. Alternatively, if the selected gray level is greater than the corresponding threshold value by an amount greater than a predetermined range, a print condition is met for that pixel and the laser is turned on for the full duration of that pixel's imaging time. If the gray level selected is in the direction of print, relative to the threshold level but is less than the full print level but within a range of values, then a look up table is entered corresponding to that threshold value and a range and a length of time for laser turn on, corresponding to time slices, is selected dependent upon the difference between the threshold level and the applied gray level. Pixel growth may proceed from either the left or right or some combination of both depending upon the coding. For example, the threshold level may include a range of values in either direction causing dot or pixel growth to occur from either the left or the right edge of the cell.

In order to accomplish the above, a print mechanism that can generate subpixel control of at least 4 time slices per pixel, which means that the laser can start and stop at a particular time slice (subpixel) of a possible pixel containing cell, is preferred. Thus at 600 dpi, the display would look like a resolution of 4×600, or 2400 in one direction. This also means that the hardware must be capable, at least in one direction or dimension, to be able to laze (laser turn on and off) for a duration of ¼ of the amount of time it normally would take to print a single PEL or pixel at a resolution of 600 dpi at whatever print speed is selected.

Other objects and a more complete understanding of the invention may be had by referring to the following description taken in conjunction with the accompanying drawings in which:

BRIEF DESCRIPTION OF THE DRAWINGS

FIG. 6 is an expanded view of a supercell comprising a matrix of 16×16 cells and containing a threshold array which has threshold locations and values which have been gamma corrected;

FIG. 7 is a look up table directly related to the address of the threshold in the supercell of FIG. 6, and illustrating a byte offset address for entering the table of FIG. 8;

FIG. 8 is a modulation table which may be entered by the appropriate byte address contained in FIG. 7, and which indicates for the selected range, and for a pointer derived from the difference between the gray level and threshold level, the laser on time to effect printing for selected cells of a supercell matrix of cells;

FIG. 10 is a PCL 5C image data to be applied to the threshold array of FIG. 6 for making a 20×20 square and for applying a wash gray tone to the square from darkest at the top to lightest at the bottom of the square;

FIG. 11 is a portion of several supercells in which the gray level value of FIG. 10 has been applied to the threshold values contained in the supercell matrix of FIG. 6 as well as a 20×20 cell drawing dimensioned to make a simple square, and;

DESCRIPTION OF THE ILLUSTRATIVE EMBODIMENT(S)

Hardware Background

Figure 1:
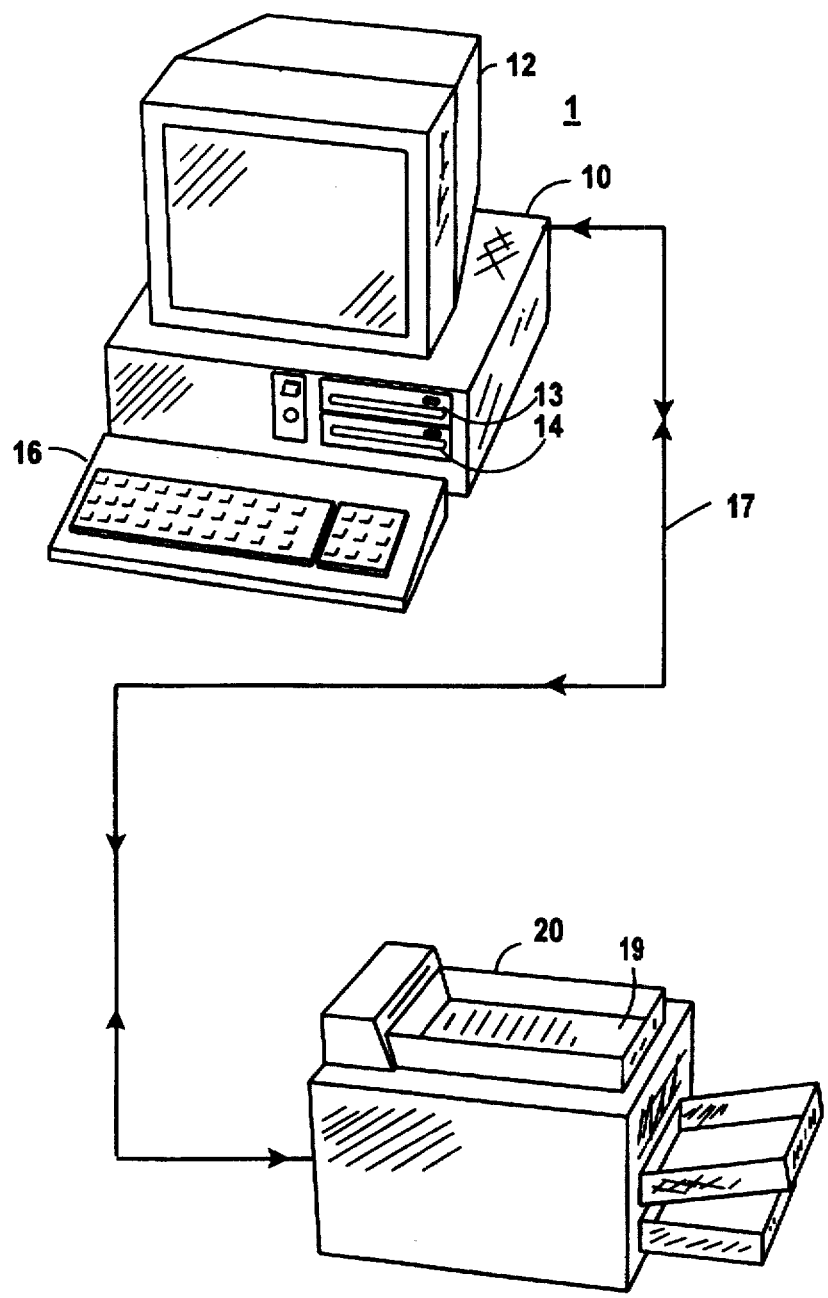
FIG. 1 is a schematic representation of a computer and printer incorporating the software and scheme of the present invention.

Referring now to the drawings, and particularly FIG. 1 thereof, a computer system 1 comprises a main chassis 10, a display or monitor 12, a connected keyboard 16 and a pointing device, e.g. a mouse or the like (not shown) which is operator controlled to move a pointer cursor on the display or monitor screen 12 and to allow operator selection of programs, text, images, functions etc. As is conventional, the chassis 10 includes a Central Processing Unit, or CPU, a memory manager and associated RAM; a fixed disk or hard drive (which may include its associated disk controller), a display manager which is connected externally of the chassis 10 to the display 12; a keyboard manager which through flexible cable (not shown) is connected to the keyboard 16; a mouse manager (which is some instances may form part of the display manager 12a, and include nothing more than a software driver) for reading the motion of the mouse and its normal control buttons. A disk manager or controller which controls the action of the disk drive 13 (and an optional drive such as a magneto-optical or CD ROM drive 14) shown in FIG. 1. rounds out most of the major elements of the computer system 1. Also illustrated in FIG. 1, connecting the computer system 1 to a printer 20 is a bi-directional cable 17. The cable is operable for conveying commands, text and image material or data to the printer 20 in a variety of forms for printing of the data on print receiving media 19, and to convey certain printer information back to the computer system 1. The printer, for our examples, is a dot printer such as a laser printer, with a capability of printing with a higher resolution in at least one direction, for example in the laze direction, (horizontally across the media), or in the process direction (vertically in the direction of movement of print receiving media), or both. An example of such a printer with these capabilities is the Lexmark International Inc. printer, model #4049, called the "OPTRA" laser printer family.

Figure 2:
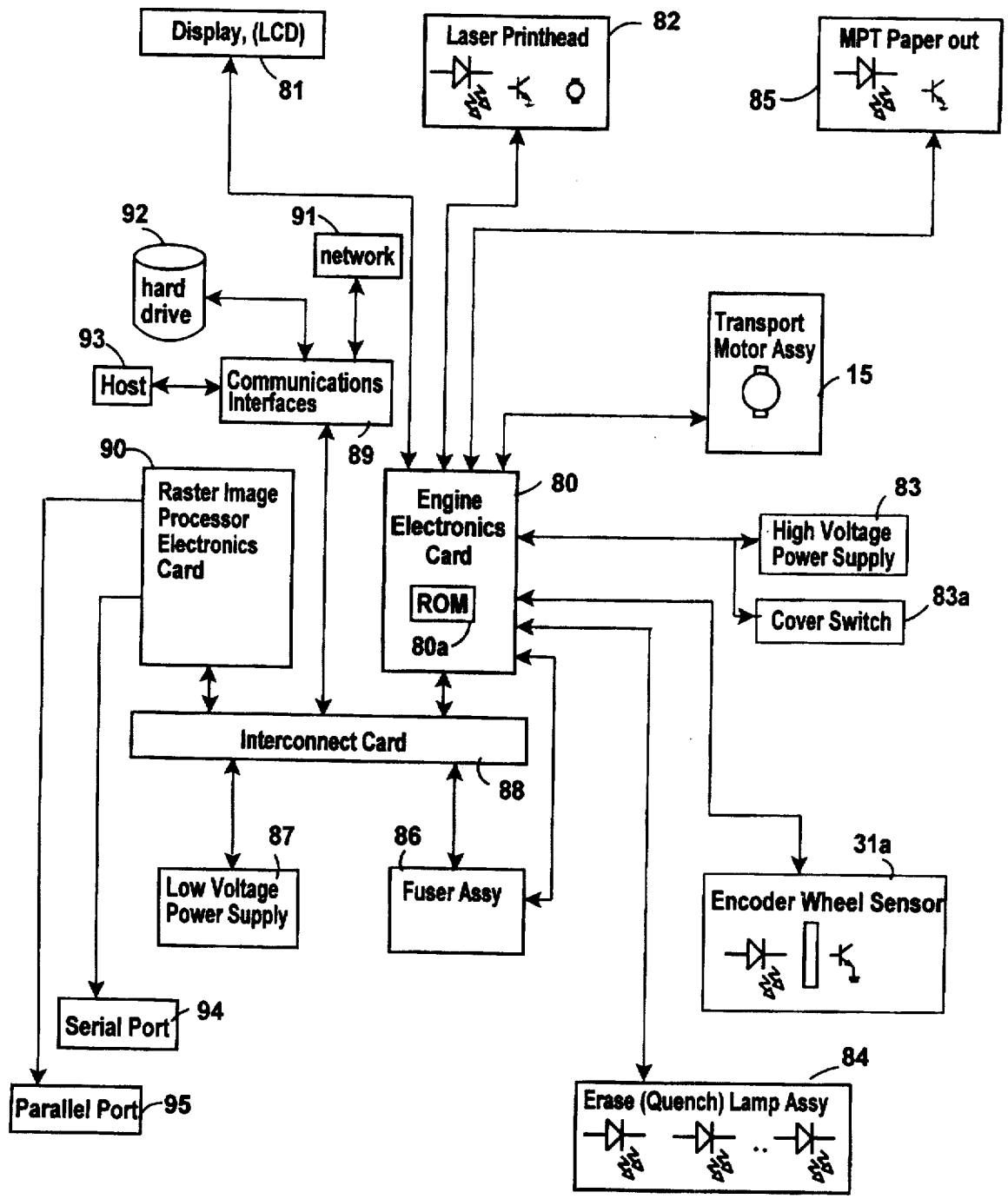
FIG. 2 is a simplified electrical diagram for the printer of FIG. 1, and illustrating the principal parts of the electrical circuit thereof.

Turning now to FIG. 2, which is a simplified electrical diagram for the printer 20 and illustrating the principal parts of the electrical circuit thereof, the printer employs two processor (micro-processor) carrying boards 80 and 90, respectively labeled "Engine Electronics Card" and "Raster Image Processor Electronics Card" (hereinafter called EEC and RIP respectively). As is conventional with processors, they include memory, I/O and other accouterments associated with small system computers on a board. The EEC 80, as shown in FIG. 2, controls machine functions, generally through programs contained in the ROM 80a on the card and in conjunction with its on-board processor. For example, on the machine, the laser printhead 82; the motor transport assembly 15; the high voltage power supply 83 and a cover switch 83a which indicates a change of state to the EEC 80 when the cover is opened; the Encoder Wheel Sensor 31a which reads the code on an encoder wheel 31 informing the EEC 80 needed electrophotographic (EP) cartridge information and giving continuing data concerning the toner supply in the cartridge. Continuing on, the EEC 80 also connects a machine display 81 which indicates various machine conditions to the operator, under control of the RIP when the machine is operating but capable of being controlled by the EEC during manufacturing, the display being useful for displaying manufacturing test conditions even when the RIP is not installed. Other functions such as the Erase or quench lamp assembly 84 and the MPT paper-out functions are illustrated as being controlled by the EEC 80.

Other shared functions, e.g. the Fuser Assembly 86 and the Low Voltage Power Supply 87 are provided through an interconnect card 88 (which includes bussing and power lines) which permits communication between the RIP 90 and the EEC 80, and other peripherals. The Interconnect card 88 may be connected to other peripherals through a communications interface 89 which is available for connection to a network 91, non-volatile memory 92 (e.g. Hard drive), and of course connection to a host 93, e.g. a computer such as the personal computer system 1 illustrated in FIG. 1.

The RIP primarily functions to receive the information to be printed from the network or host and converts the same to a bit map and the like for printing. Although the serial port 94 and the parallel port 95 are illustrated as being separable from the RIP card 90, conventionally they may be positioned on or as part of the card, and connect through one or the other of those ports to cable 17.

Figure 3:
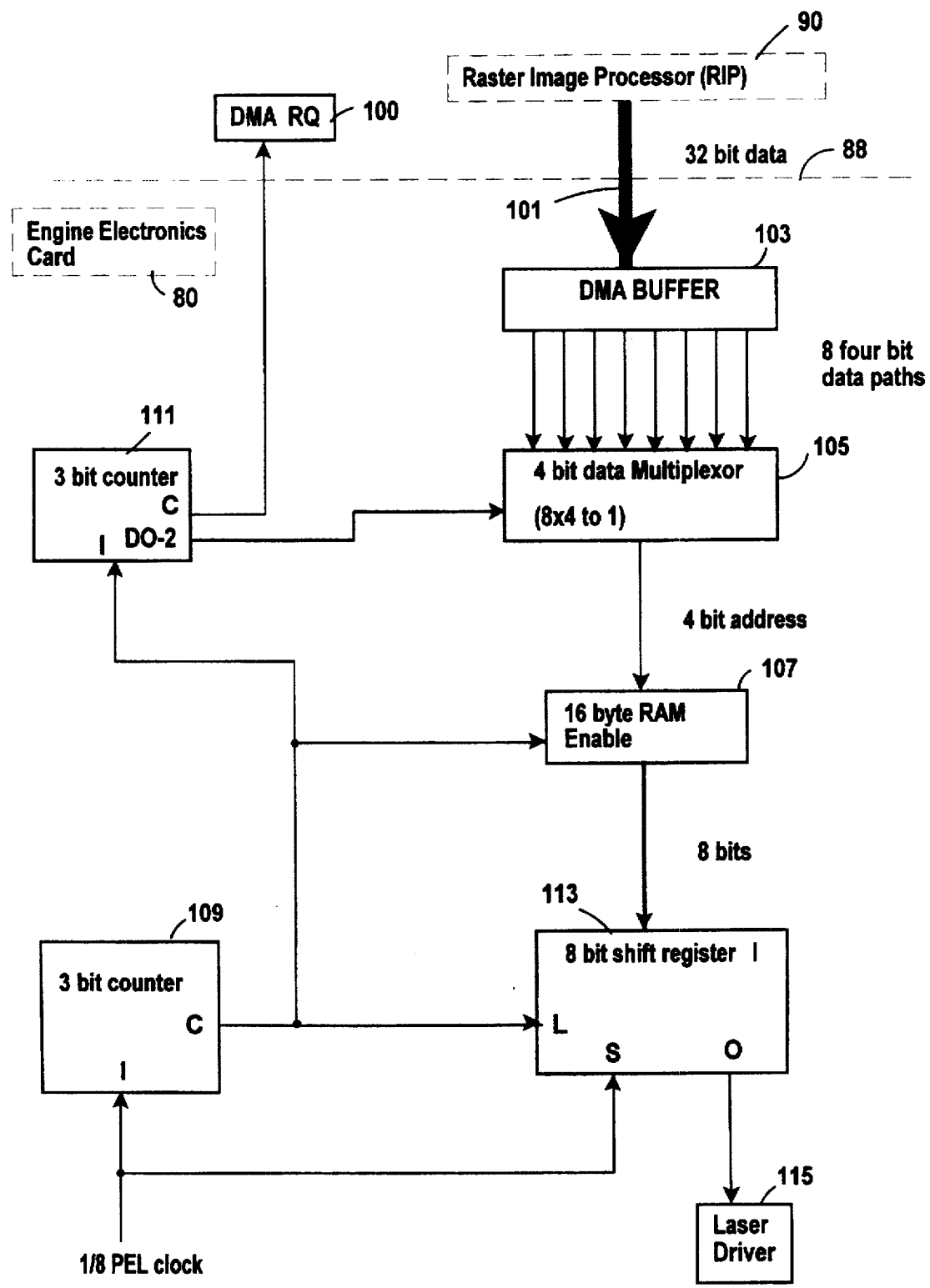
FIG. 3 is a simplified electrical circuit diagram for presentation of necessary print commands to the laser print head, and for operation of the printer in accordance with the present invention.

The preferred embodiment of this invention uses the hardware described in FIG. 3 to actuate the laser.

What is illustrated in FIG. 3, is that a DMA request 100 is made of the Raster Image Processor (RIP) 90, and sent across the interconnect card 88 via a 32 bit bus 101 (in 32 bit chunks) into a DMA buffer 103 associated with the engine electronics card (EEC) 80. From the DMA buffer 103, eight four bit data paths are applied to a multiplexor 105 which applies serially a 4 bit address to a 16 byte RAM 107. The laser actuation waveforms are addressed via 4 bit addressing with 8 time slices per cell, such as the table shown in FIG. 12, which indicates the particular time slices for which the laser print head 82 shall be turned on. The 3 bit counter 109, is merely a state counter which counts from 0–7 to select, through 3 bit counter 111, one of the 8 groups of 4 bits of data that came from the DMA buffer 103 into the multiplexor 105. The output of the 3 bit counter 109 is applied to the enable input of the RAM 107, and the input of the second 3 bit counter 111 for operation of the multiplexor 105. The ⅛ PEL clock inputs into an 8 bit shift register 113, with the carry-out output "C" of the 3 bit counter 109 clocking the load function of the shift register 113 loading the 8 bits from the Ram 107 and outputting a single bit to the laser driver 115 and thus to the laser printhead 82.

The Print Source

In the examples which follow, the example printer has a 600 dpi resolution, but is capable of a higher resolution in at least one direction. The example given is a print head and associated electronics with the capability of printing 4800 dpi in the "X" direction. Moreover, it is assumed that the associated printer drivers for the computer system 1, and the printer 20 have the requisite ability to provide both image and text data to the printer in various formats such as, but not limited to, PostScript®[3], and PCL®[4] 5C.

[3]PostScript is a trademark of Adobe Systems
[4]PCL is a trademark of Hewlett Packard Corp.

Figure 5:
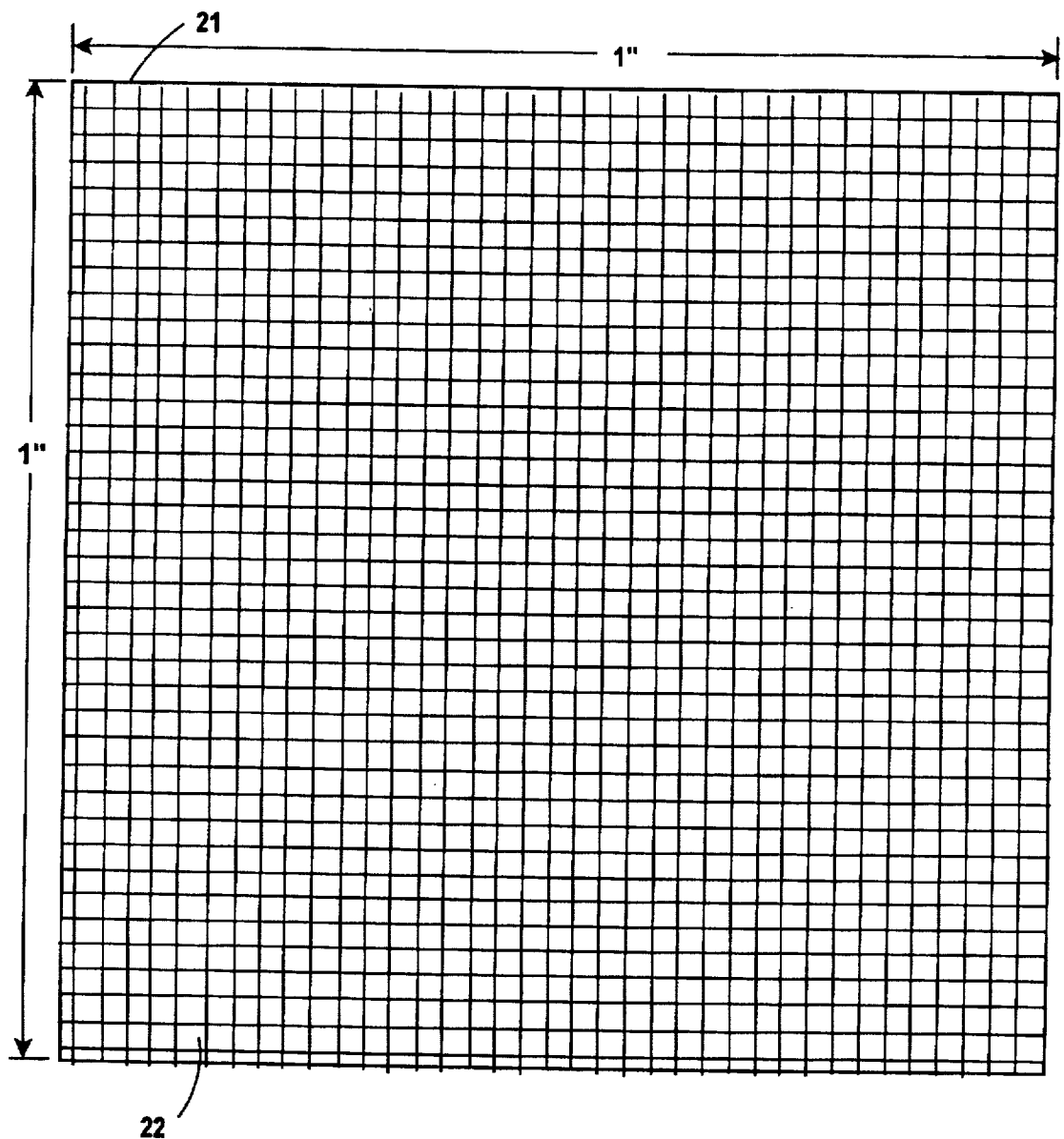
FIG. 5 is an expanded (~6x) representation of a 1"×1" square containing square supercells, each supercell comprising a matrix of 16×16 cells, each of the cells having a capability of including a dot, pixel or picture element (PEL)

The present invention employs a print scheme using halftone supercells which comprise dividing each square inch of a print map 21 into a matrix of print cells, each cell being defined as having a square dimension with each side of the square equal to 1/print-resolution in dots per inch (dpi). (Thus ⅙₀₀=a square with 0.00167 inches on a side) In FIG. 5 each small square 22 represents one supercell. For our example purposes each supercell 22 (which is shown at an enlargement of ~6x) comprises a matrix of print cells (hereinafter cells) 16 cells×16 cells. Thus in one linearly measured inch, there would be 600/16=37.5 supercells. In a square inch with 600 dpi, there are 37.5×37.5 supercells.

In accordance with the invention, and referring now to the table shown in FIG. 6, each of the cells of each of the supercells 22 is mapped with a threshold value (decimal number) between 0 and 255 in repeating sequences in each row, the sequence being repeated with an offset, in the present instance 4 cells, and at least a partial repeat every eight rows of the 16 rows with the repeated threshold values arranged at 45 degrees. Inasmuch as adjacent supercells are identically mapped, the partial repeat joins appropriately to the adjacent cell to continue the threshold value mapped matrix. For ease of discussion, the rows have been numbered in bold type (0–15) in the left most column 23, while the columns have been numbered in bold type (0–15) in the first row 24. As an example of the repeating sequence, at address 0,0 extending to 0,7 are threshold values 232 . . . 222, the sequence being repeated from address 0,8 to 0,15. Note also that the sequence starts again at address 4,4 and extends to 4,11, and then starts again at 4,12 and extends to 4,15 with a partial sequence of 232 . . . 127. With an identical supercell adjacent horizontally and vertically, this arrangement of matrix thresholds, as will be seen, provides identical treatment at a 45 degree angle of threshold placement. To observe that this is true, note that the last four cells 232 ... 127 in row 4, when coupled with the first four cells 147 ... 222 makes up a complete threshold sequence of 232 ... 222. An examination of any eight cell sequence, in any column or row will show identical threshold value treatment.

The threshold values were picked, as shall become more evident hereinafter, so that if a gray level (or gray tone) of some percentage is desired for a particular area, an eight bit value (decimal 0–255) representative of that percentage of 255 will give an appearance to the eye of that gray level when applied to the threshold values of that supercell 22.

In the halftone supercell, the threshold level is such that the laser 82 will be turned on or not, i.e. binary. As will be seen, if the threshold value in the cell of the matrix is above an applied eight bit gray level value, the laser printhead or laser 82 is off, and the cell is so marked, e.g. with a "0". If the threshold value is below the applied or gray level eight bit value, and below a range set forth in a look up table, the cell is marked as being on ("15"). If the threshold value for the cell is within the range, the cell is lazed for predetermined time slices, which, in conjunction with the lazed dots and non-dots, give the desired gray level appearance to each supercell. (This is why an extended resolution in at least one direction is necessary). In other words, the supercell 22 is arranged in a matrix of cells having threshold levels. Below a selected threshold value, those cells in the supercell having a threshold value less than the selected value will cause those cells to be marked for being turned on for the full period of time (e.g. maximum number of time slices in the cell). Those cells having a threshold level greater than the applied gray level value, will be marked so as not to be turned on (no-print). Those cells within a range associated with the selected threshold value will be turned on for predetermined time slices in the range.

The range is selected by association to a lookup table indexed into by the location of the threshold value. This location is then identified with the identical location in an index table 25, shown in FIG. 7, and containing a 16×16 array of byte addresses. The address at any particular location allows row entry into a modulation table 26 (FIG. 8) where the difference between the desired gray level value and the selected threshold value is employed as an index or pointer into the appropriate column of the table, the intersection of row and column identifying how many time slices the beam should be turned on for the particular cell.

It should be noted that processing of the entries in the cells is serial, i.e. cell by cell. Therefore the gray level comparison with the threshold value in each cell is entered as to location in the index table 25 in FIG. 7, the address given there being employed as an entry into the modulation table 26 in FIG. 8 and the difference between the threshold value and the gray level value determining the index or pointer number which points to the column in the table which indicates the number of time slices the laser beam should be turned on for that particular cell. If the difference between the gray level value and the threshold value is greater than +11, (or alternatively less than the largest time slice pointer +1) then the cell can be marked as on "15". If less than "0" it can be marked as a "0".

The easiest way to understand the operation of the tables, i.e. the threshold array table of FIG. 6, the index table 25 of FIG. 7 and the modulation table 26 of FIG. 8 is with a few examples. Assume that the threshold array 22 of the supercell print map 21 shown in FIG. 6, is applied with an eight bit gray level value of 110 (decimal). Each of the cells is addressed with the gray level value serially. A study of the threshold values in FIG. 6 show that the first threshold value below the gray level value is 105 and all pixel locations with a value less than 105 will be marked with a value, for example decimal "15" indicating that the laser should be turned on for that cell and all those cells having threshold values with a value in excess of 110 should be marked with, for example a decimal "0"so that the laser would be turned off. Thus the pixels associated with the first cell with a threshold 232, the 3rd cell 117, 4th 127 would all be off and the cell immediately below the cell 105 with a value of "1" as well as the cells "21, 81, 11, 33, 69, 45, 57, 93" would be marked "15" and turned on fully for the generation of a pixel in each cell. (Note that these markings of "0" for no-print and "15" for print equate to the laser driver waveforms table for multibit, 4 bit addressing, with 8 time slices/cell, shown at "0" and "15" in FIG. 12).

Now, with a gray level value of 110, as in the example, the nearest threshold value below that value is 105, which in the "Threshold array" table of FIG. 6 first appears at location 0,1, i.e. the second cell in the first row. Taking that location to the "Index Table" 25 of FIG. 7, location 0,1 has stored therein a byte relative number "26", which gives a byte address into the modulation table 26 in FIG. 8 which has been gamma compensated for 106 lpi. Looking at the modulation table, at the row identified as address 26, (actually 26 bytes below the start of the table, counting a byte for each "Range" selection number given in the second column of the table) a series of 12 numbers appear (because the range given is 12, and 12 in the illustrated instance is the first number in the sequence.) Subtracting the threshold value 105 from the selected gray level value 110=5, and using this number as a pointer into the string of numbers to the column with a pointer number of 5, gives a number "4" at the intersection of the row and column. This number equals the number of time slices (8 time slices per pixel cell) that the pixel is on. This would be ⅘ of a cell in time slices that the pixel is turned on. Again, referring to the laser driver waveforms table FIG. 12, the number 4 illustrates that the laser should turn on the cell for 4 slices of the 8 time slices.

By using a supercell for gray tones and using threshold value entries into a table, the modulation table will indicate how many time slices within selected cells the laser beam is turned on, as well as whether the pixels are on or off in other cells merely by whether they are above or below a selected threshold value. An examination of the threshold numbers of the threshold array table of FIG. 6 will show that applying a threshold number of 128, in a 16 cell×16 cell array supercell, will give the supercell the appearance of having a 50% gray tone. (At 128, all pixels below 127 threshold will be marked with an "15" and the laser will effect a full 8 time slice print or dot, i.e. the cells thus designated will be on fully. Going into the cell 0,3 in the index table 25 (FIG. 7), which corresponds to table address 0,3 in the threshold array table of FIG. 6, the address 15 is given. Using 15 as the address, then the modulation table of FIG. 8 indicates for address 15 a range of 10 and the pointer=1 (i.e. 128−127=1). The second entry at address 15, in the Modulation Table, at the pointer "1" indicates that only two time slices are turned on, which means that the laser 82 is turned on for that cell of the 16×16 array only two out of the eight time slices.

The gamma compensated values shown in FIGS. 6, 7 and 8 were obtained by first creating tables that assume linear response, printing sample squares of all intensities, and then measuring the printed squares with a densitometer. From the measurements the L*[5] range of each pixel in the halftone cell can be determined. A desired L* response can be achieved by adjusting the threshold values such that the requested intensity level would turn on the appropriate number of pixels in the halftone cell to achieve the L* response. The L* responses for the halftone supercell with a pel fully off and then fully on describe the range of intensities over which the time slices must be applied. FIGS. 7 and 8 were derived by determining such ranges, compiling the list of such ranges (FIG. 8), and providing a table of addresses to such ranges for each pixel in the supercell. FIG. 8 is the means by which the intensity table is locally linearized.

*L* is a gray scale based upon human perception from 100–0 of the whitest white to the blackest black respectively.

Figure 9:
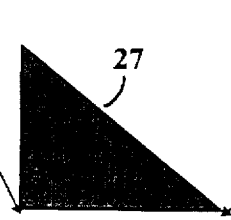
FIG. 9 is a portion of several supercells in which a gray level value has been applied to the threshold values contained in the supercell matrix as well as a drawing dimension to make a simple triangle in accordance with a well known page description language program.
Figure 11:
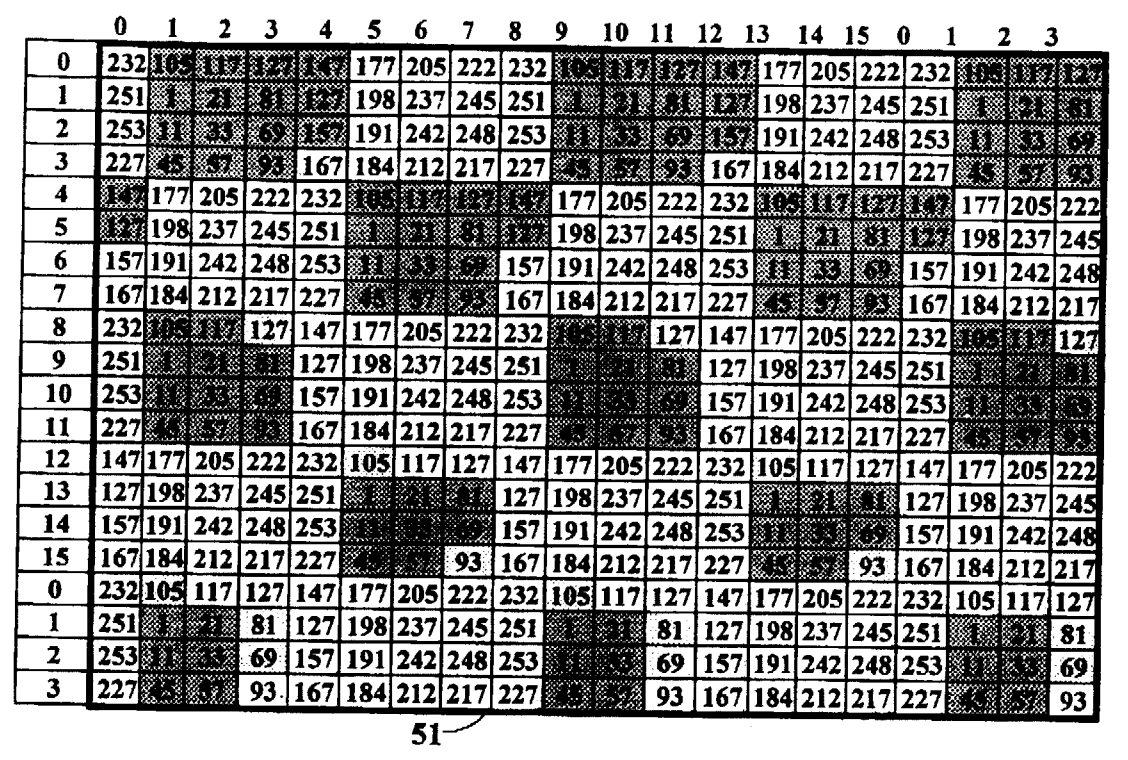

In order to better understand how an image print may be combined with a selected gray level applied value to the threshold array table or print map 21 shown in FIG. 6, and referring now to the accompanying sample code in conjunction with FIGS. 9–11, two examples are set forth in code at the end of this specification and labeled Example #1 and Example #2 for purposes of identification. The first is an example of PostScript® in which it is desired to print a small triangle with a gray level set at 110 out of 255. The code is that which would be presented to the RIP 90 from the computer system 1. Generically, this is step 30 (mathematical representation of the area to cover combined with a floating point representation of the desired gray level) shown in FIG. 4A.

FIG. 9 illustrates a portion of several supercells in which the gray level value has been applied (compared) to the threshold values contained in the supercell matrix as well as a drawing dimension to make a simple triangle in accordance with the PostScript® page description language program set forth above. A PostScript® interpreter within the RIP 90 converts the instructions in the code above to form the triangle 27 and applies the converted gray level of 110 to its 8 bit value (6E hex or 1101110) for application to the threshold array table 21 shown in FIG. 6, and replicated in FIG. 9. This corresponds to process step 32 in FIG. 4A.

Figure 4A:
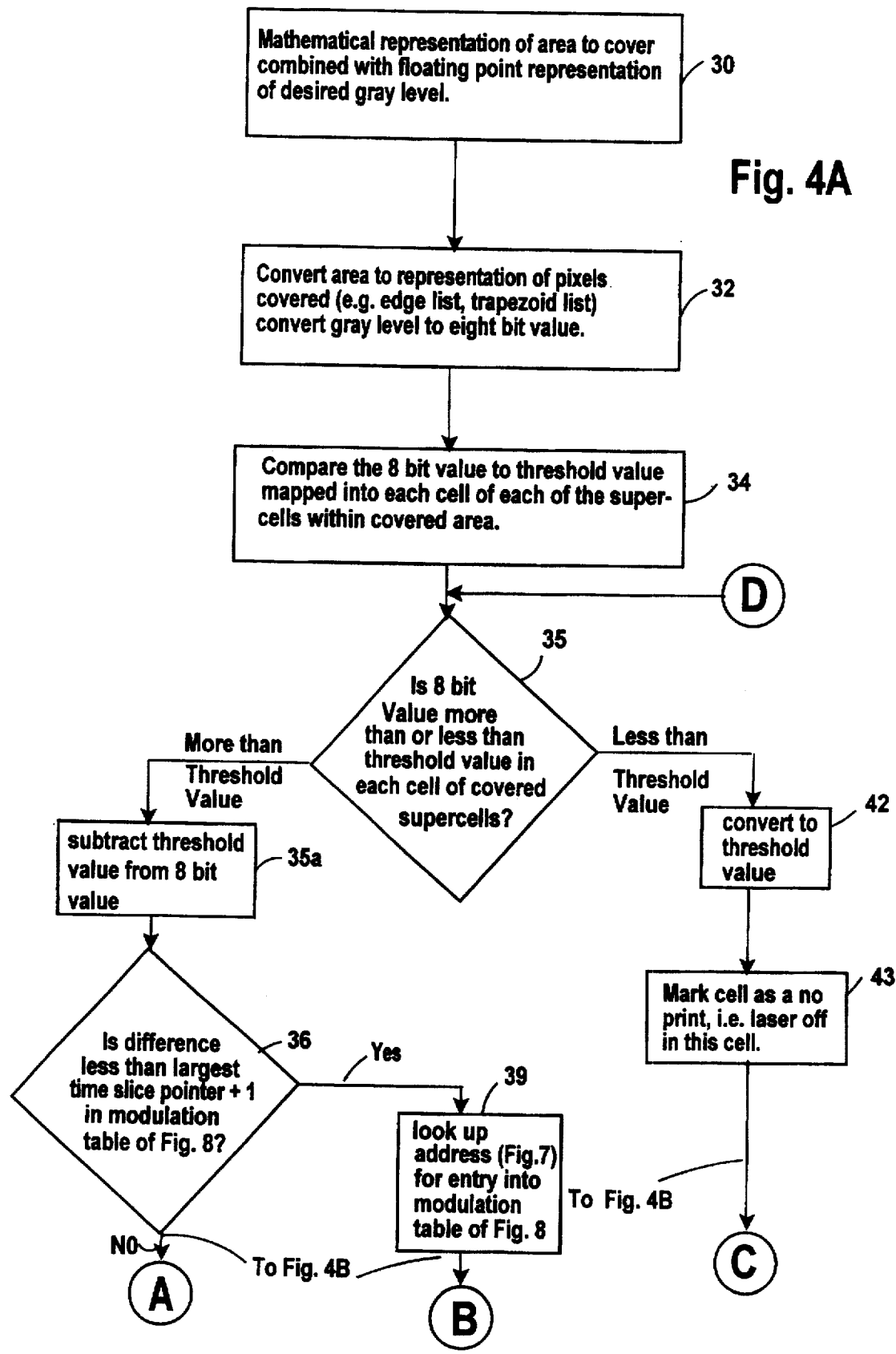
FIGS. 4A and 4B are functional logic diagrams indicating the novel method of the present invention for operation in conjunction with FIGS. 1-3.
Figure 4B:
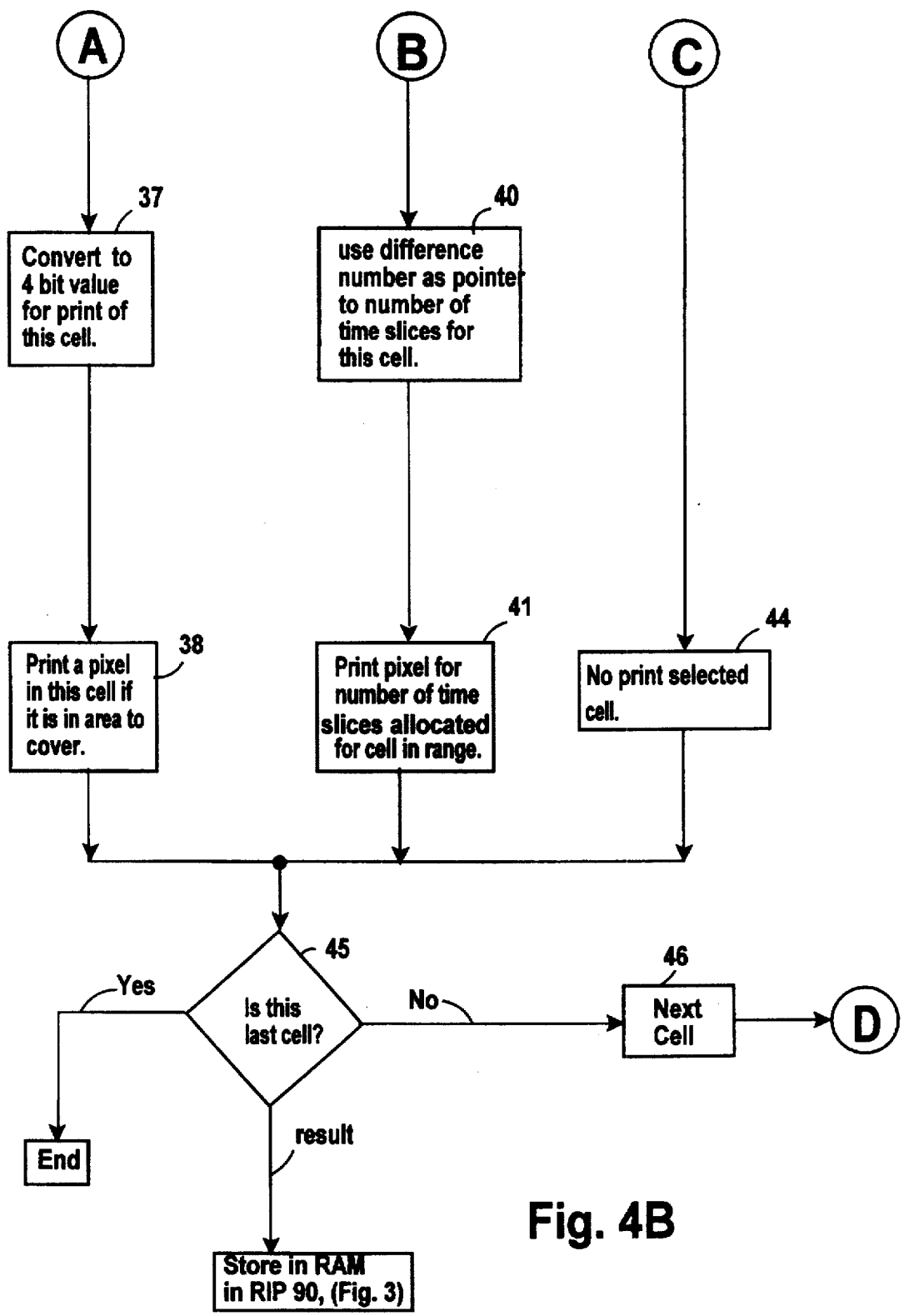

In FIG. 9, as in the example given heretofore, the cells below the threshold value of 105 are marked with a "15" and then sent to the RIP 90, as shall be described hereinafter. As noted in FIGS. 4A and 4B, the logic steps 34, 35, 35a, 36, 37, 38, 45 and 46 then into RAM storage in RIP 90, respectively apply to the print-a-pixel step. In FIG. 9, the result of such activity is indicated by the darkest "pixel full on" in the drawing. In the event of no-print, i.e. the threshold values are above 110, the logic steps in FIG. 4A and 4B are through 35, 42 (convert to a no-print address), 43, 44, 45, 46 and to the RIP 90. If the cell being examined is the next lower adjacent threshold value, in the example 105, then index table 25 in FIG. 7 is entered to find the appropriate byte offset, lookup modulation table 26 in FIG. 8 is entered and the number of time slices for laser on is determined. As shown in FIG. 4A and 4B, the forgoing is accomplished in steps 39, 40 and 41 and once again stored in the RIP 90 for processing such as heretofore described relative to FIG. 3. The resulting triangle 27 in FIG. 9 approximates the gray level set in the code, but should not be considered accurate. For example, the gray covering the cells having a threshold value below 105, i.e. "1, 21, 81, 11 etc." should be black and 105 should be an appropriate level of gray. These cells were intentionally left lighter so that the reader could view the threshold numbers within the cell.

Example #2 is a PCL 5C simplified code for printing a 20 cell×20 cell rectangle, (in the present instance a square) with varying levels of gray tone, shown in FIG. 11. The code is employed to make the PCL Image Data shown in FIG. 10, and then combined, as will be described hereinafter, with the threshold array values found in FIG. 6 to print, via the electronics of FIG. 3, the rectangle with the varying gray levels. Briefly describing the above "C" code, and its relationship to the hexadecimal PCL 5C code below the C code, once again the explanations for the lines of code are given parenthetically in brackets and in italics.

C code representation used to generate the PCL hexadecimal code given below. (A compiler was used to generate test case.)

The PCL image data shown in the chart 50 in FIG. 10, and formed as shown in Example #2 is then applied to the threshold values of FIG. 6 which results in a gradual shading effect within the box 51 of 20×20 cells shown in FIG. 6. For example, in rows "0" and "1", the logic process of FIGS. 4A and 4B is applied to each threshold level of FIG. 6 with the applied value of 183; in rows 2,3 the applied gray level value has dropped to 171 resulting in a difference in gray level for the cells at addresses 3,4 and 3,12 from black to 4 time slices on for every eight time slices in each of the cells 167 in row 3. (Note that the difference between 171, the applied gray level value and 167, the threshold value, is 4. Using the table of FIG. 8, and with a pointer of 4 gives the number of time slices on of 4). A continuation of this process down the page gives the effect of the gray level "washing" out and gives an appearance to the eye that the block 51 is darker at the top than at the bottom. The gray level printed in FIG. 11 approximates the desired gray level but should not be considered accurate. For example, the gray covering the cells having a threshold value which should be black were intentionally left lighter so that the reader could view the numbers within the cell.

Referring briefly back to FIGS. 4A and 4B, it has been noted that the output of the decision logic step 45 "Is this last cell?" dumps the contents into RAM in the RIP 90. While the RAM may be of any convenient size, to hold, for example a full page of data, it should be recognized that some smaller amount, e.g. sufficient to hold some number of lines such as 128, will suffice.

Figure 12:
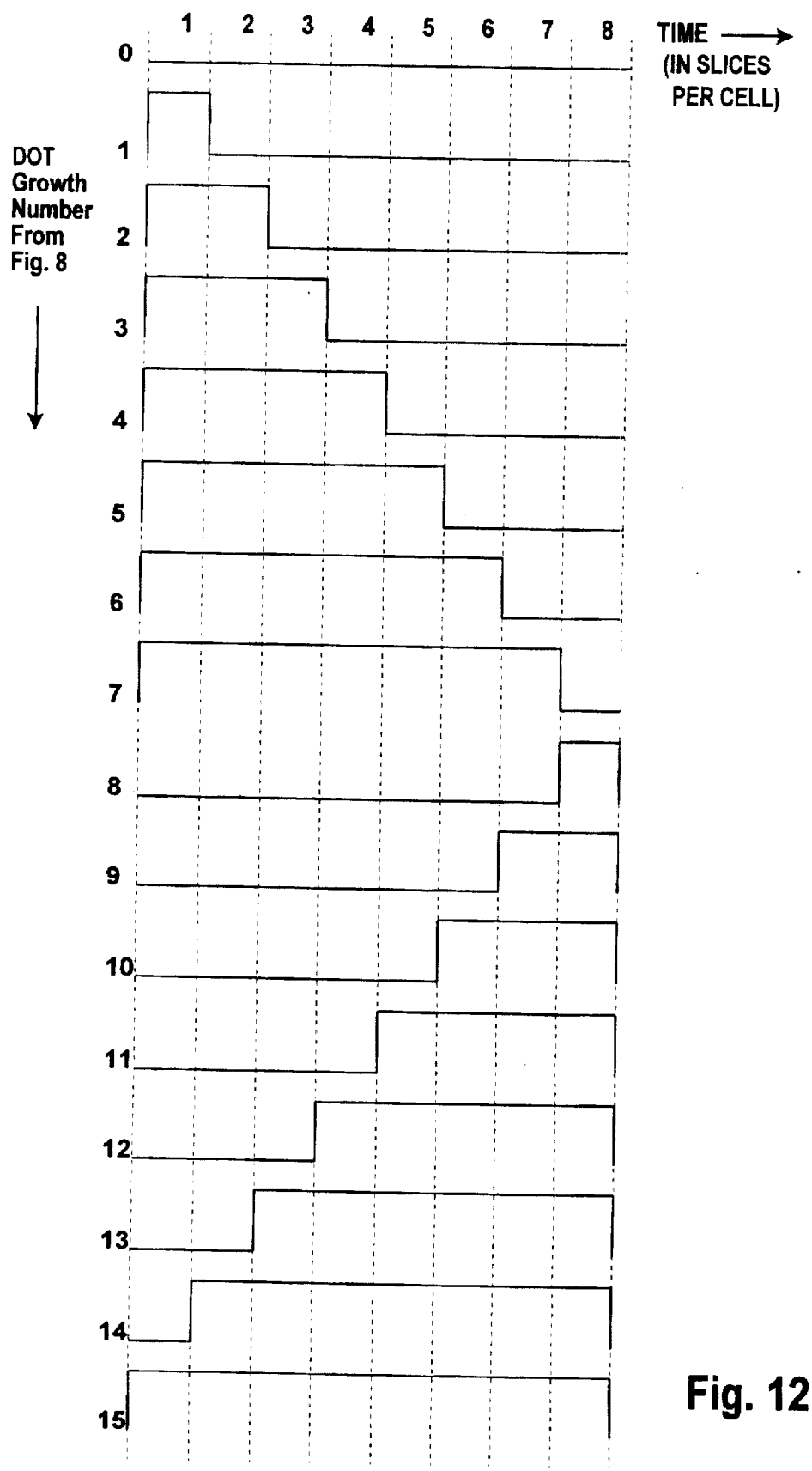
FIG. 12 is a typical cell growth of selectable laser driver wafeforms for multibit, 4 bit addressing, with 8 time slices per cell.

With regard to FIG. 12, wherein laser driver waveforms table for Multibit, 4 bit addressing, with 8 time slices per pixel values is displayed, it should be noted that while the modulation table of FIG. 8 utilizes only 3 bit addressing, 4 bit addressing would allow growing of the time slices not only from the left edge of the cell but also from the right edge, such as illustrated by the dot growth numbers 8–14.

Thus the present invention enhances the print quality of binary laser printers, which are capable of extended resolution in at least one direction. Moreover, the present invention provides a method and apparatus for simplifying printing of images, textual material and the like while increasing the ability to print a great number of gray scale levels in a binary print system, with almost any page description language (PDL).

Although the invention has been described with a certain degree of particularity, it should be recognized that elements thereof may be altered by person(s) skilled in the art with out departing from the spirit and scope of the invention as hereinafter set forth in the following claims.

EXAMPLE #1

(In the following code, explanations are set forth parenthetically and italicized for ease of viewing.)

%!PS-Adobe-2.0 (%=rem statement for PostScript®) 110 255 div setgray (set gray level 110 div by 255; same threshold entries) newpath 100 100 moveto (Moveto location 100, 100. This is movement in ½nds of an inch, and indicates a desired starting location address in memory) 0–30 rlineto (draw relative line down (−30) and 28 +30 rlineton (then draw a line to the right, (28); and then Up 30,) closepath (have end of line at up 30, close with the beginning, forming a triangle) fill showpage

EXAMPLE #2

C code representation used to generate the PCL hexadecimal code given below. (A compiler was used to generate test case.)

"printer_reset( ); [printer reset, which corresponds to "1B 45";]

raster_graphics_resolution(300); [setting the "raster graphics resolution" at 300 dpi: this corresponds to "1B 2A 74 33 30 30 52";]

source_transparency_mode(1); [setting the transparency of the source or the pattern_transparency_mode(1); [pattern to either opaque or to transparent.]¹ logical_operation(204);

¹Note: In our example, we have designated the resolution of the printer at 600 dpi. As the raster graphics resolution has been set at only 300, the remaining settings relating to width and height must be halved in the settings, and in the PCL image data formed in FIG. 10, each line created must be doubled because the resolution has been doubled.)

raster_width(10); [raster width and raster height command are set at 10 cells (because as explained above the setting is at 600), and therefore at 600 dpi would be doubled to 20×20;]

raster_height(10);

configure_image_data(6L, "000308080808");

set_compression_mode(0); [no compression;]

start_rig(1); [command to start the image in the 3 color mode in PCL 5C language; in the color mode it requires 3 bytes for color description +1 byte for print/no-print. (As an aside, the normal colors in "negative color printing" are subtractive, and they are cyan, magenta and yellow, as opposed to the RGB colors of red, green and blue which are employed in an additive process.) In this line, 30 equals the number of bytes following, and the repetitive numbers in hex are for the colors. A weighted conversion is implemented by algorithms in the ROM, in a well known technique, for converting the color information to black and white.]

rig(30,"48484854545460606060C6C6C78787884848 49090909C9C9CA8A8A 8B4B4B4"); [These are the numbers (in Hex) that when converted to decimal may be found in the PCL image data chart 50 in FIG. 10, plus a decimal 3 has been added to each of the gray level values. For example, B4=180 decimal, plus 3=183; A8=168 decimal, plus 3=171]

set_compression_mode(3); [set compression mode 3]
rig(0,""); [means that it is identical to the previous rig command]
rig(0,""); [means that it is identical to the previous rig command]
rig(0,""); [means that it is identical to the previous rig command]
rig(0,""); [means that it is identical to the previous rig command]
rig(0,""); [means that it is identical to the previous rig command]
rig(0,""); [means that it is identical to the previous rig command]
rig(0,""); [means that it is identical to the previous rig command]
rig(0,""); [means that it is identical to the previous rig command]

-continued rig(0,""); [means that it is identical to the previous rig command]
end_rig(OLD_END); [end]
FF;" [form feed]

1B 45 1B 2A 74 33 30 30 52 1B 2A 76 31 4E 1B 2A 76 31
4F 1B 2A 6C 32 30 34 4F 1B 2A 72 31 30 53 1B 2A 72 31
30 54 1B 2A 76 36 57 00 03 08 08 08 08 1B 2A 62 30 4D
1B 2A 72 31 41 1B 2A 62 33 30 57 48 48 48 54 54 54 60
60 60 6C 6C 6C 78 78 78 84 84 84 90 90 90 9C 9C 9C A8
A8 A8 B4 B4 B4 1B 2A 62 33 4D 1B 2A 62 30 57 1B 2A
62 30 57 1B 2A 62 30 57 1B 2A 62 30 57 1B 2A 62 30 57
1B 2A 62 30 57 1B 2A 62 30 57 1B 2A 62 30 57 1B 2A 62
30 57 1B 2A 72 42 0C

What is claimed is:

1. A method of enhancing the print quality in a binary printer which converts digital data by addressing a high frequency of dots in at least one dimension on print receiving media, and at a greater resolution in at least one of two print directions than the nominal rating of said binary printer, the method comprising:

supplying a representation of areas to print and a single desired gray intensity value for each one of said areas;

converting each one of said areas to a representation of pixels to be covered, and converting said gray intensity value for each one of said areas to a digital intensity number;

comparing said number for each one of said areas to a predetermined matrix representation of cells arranged in supercells, each cell of each one of said supercells representing a pixel and including a threshold number for each of said cells of said supercells; said threshold numbers when less than or equal to said desired gray intensity number, effecting a cell print, and when greater than said gray intensity number effecting a no cell print;

obtaining for each cell print a single digital value from a second predetermined matrix having one value corresponding to each said representation of cells by said first matrix, determining for each cell print the arithmatic difference between said intensity number and said threshold number, employing said each said single digital value as a first address in a table of laser on conditions, said laser on conditions not being linearly related to arithmatic differences of said intensity numbers, employing said arithmatic differences as a second address in a table, said first said address and said second said address defining a single entry in said table, and maintaining an on condition of said printer in each cell of said supercells in an amount defined by its value in said table.

\* \* \* \* \*